United States Patent
Aono et al.

(10) Patent No.: US 9,709,714 B2
(45) Date of Patent: Jul. 18, 2017

(54) CURVED FACE DIFFRACTION GRATING FABRICATION METHOD, CURVED FACE DIFFRACTION GRATING CAST, AND CURVED FACE DIFFRACTION GRATING EMPLOYING SAME

(71) Applicant: HITACHI HIGH-TECHNOLOGIES CORPORATION, Tokyo (JP)

(72) Inventors: Takanori Aono, Tokyo (JP); Yoshisada Ebata, Tokyo (JP); Shigeru Matsui, Tokyo (JP); Tetsuya Watanabe, Tokyo (JP); Yugo Onoda, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 214 days.

(21) Appl. No.: 14/406,168

(22) PCT Filed: Jun. 3, 2013

(86) PCT No.: PCT/JP2013/065398
§ 371 (c)(1),
(2) Date: Dec. 5, 2014

(87) PCT Pub. No.: WO2013/183601
PCT Pub. Date: Dec. 12, 2013

(65) Prior Publication Data
US 2015/0192713 A1    Jul. 9, 2015

(30) Foreign Application Priority Data

Jun. 8, 2012 (JP) .................................. 2012-130354
Jan. 9, 2013 (JP) .................................. 2013-001829

(51) Int. Cl.
*G02B 5/18* (2006.01)
*B32B 37/24* (2006.01)
(Continued)

(52) U.S. Cl.
CPC ............ *G02B 5/1847* (2013.01); *B29C 59/02* (2013.01); *B32B 37/12* (2013.01); *B32B 37/24* (2013.01);
(Continued)

(58) Field of Classification Search
CPC ...... G02B 5/18; G02B 5/1847; G02B 5/1852; B29D 11/00317; B29D 11/00326;
(Continued)

(56) References Cited

U.S. PATENT DOCUMENTS

| 4,330,175 A | 5/1982 | Fujii et al. |
| 2002/0001108 A1* | 1/2002 | Yeo ...................... G02B 5/1814 359/8 |

(Continued)

FOREIGN PATENT DOCUMENTS

| JP | 55-133004 A | 10/1980 |
| JP | 61-072202 A | 4/1986 |

(Continued)

OTHER PUBLICATIONS

Extended European Search Report received in corresponding European Application No. 13801434.5 dated Apr. 25, 2016.

*Primary Examiner* — Kimberly N Kakalec
(74) *Attorney, Agent, or Firm* — Mattingly & Malur, PC

(57) ABSTRACT

A curved surface diffraction grating fabrication method for fabricating a curved surface diffraction grating having a desired curvature with high accuracy, includes: a step of forming a diffraction grating pattern on a flat-shaped silicon substrate; a step of curving the silicon substrate on which the diffraction grating pattern is formed, by pressing, in a heated state, a fixing substrate having a shape with a desired curved surface onto the silicon substrate and of fixing the silicon substrate on which the diffraction grating pattern is formed to the fixing substrate having the shape with the curved
(Continued)

surface, to fabricate a curved surface diffraction grating cast; and a step of bringing a member having flexibility into contact with the curved surface diffraction grating cast, to transfer the diffraction grating pattern to the member.

5 Claims, 7 Drawing Sheets

(51) Int. Cl.
- *B32B 38/00* (2006.01)
- *B32B 37/12* (2006.01)
- *B29C 59/02* (2006.01)

(52) U.S. Cl.
CPC ............ B32B 38/0012 (2013.01); G02B 5/18 (2013.01); G02B 5/1814 (2013.01); G02B 5/1852 (2013.01); *B32B 2551/00* (2013.01); *Y10T 156/1028* (2015.01)

(58) Field of Classification Search
CPC ........ B29D 11/00336; B29D 11/00346; B29D 11/00413; B29D 11/00769
USPC .......... 264/1.1, 1.21, 1.32, 1.34, 2.5
See application file for complete search history.

(56) References Cited

U.S. PATENT DOCUMENTS

| | | | |
|---|---|---|---|
| 2007/0091472 A1* | 4/2007 | Alkemper | ............... G02B 3/00 359/796 |
| 2011/0110499 A1 | 5/2011 | Mitsuda et al. | |
| 2012/0002785 A1 | 1/2012 | Kaneko | |

FOREIGN PATENT DOCUMENTS

| | | |
|---|---|---|
| JP | 08-029610 A | 2/1996 |
| JP | 08-211214 A | 8/1996 |
| JP | 09/00509 A | 1/1997 |
| JP | 2010-025723 A | 2/2010 |
| WO | 2008/081555 A1 | 7/2008 |

\* cited by examiner

CURVED FACE DIFFRACTION GRATING FABRICATION METHOD, CURVED FACE DIFFRACTION GRATING CAST, AND CURVED FACE DIFFRACTION GRATING EMPLOYING SAME

FIELD OF THE INVENTION

The present invention relates to a method of fabricating a curved surface diffraction grating for dispersing and converging light and a curved surface diffraction grating cast for fabricating the curved surface diffraction grating.

BACKGROUND OF THE INVENTION

Since a curved surface diffraction grating for a spectrophotometer has capabilities of dispersing and converging light, the number of parts to be used can be reduced, thereby making it possible to simplify the structure of the device. In conventional technologies, a curved surface diffraction grating is fabricated by fabricating a curved surface diffraction grating cast by a method of ruling a curved surface substrate with machine, such as a ruling engine, and by transferring a ruled pattern to resin, metal, or the like.

As a curved surface diffraction grating fabrication method, PCT international publication WO08/081555 discloses a concave blaze-type diffraction grating manufacturing method using photolithography and an ion-beam etching process for semiconductors.

Japanese Unexamined Patent Application, Publication No. Sho 61-72202 discloses a technology in which a diffraction grating pattern is formed on a flexible material, such as resin or a metal thin film, the flexible material is attached to a substrate that is curved so as to have a predetermined curvature, to obtain a cast, the cast is brought into contact with a liquid-state curved surface diffraction grating material, which has not been hardened, and then the curved surface diffraction grating material is hardened, thereby fabricating a curved surface diffraction grating.

Japanese Unexamined Patent Application, Publication No. Hei 8-29610 discloses a technology in which a replica layer (diffraction grating part) using reactive curing resin is laminated on a flexible substrate, and a flat-shaped diffraction grating is curved by utilizing cure shrinkage of the reactive curing resin.

Japanese Unexamined Patent Application, Publication No. Hei 9-5509 discloses a technology in which a flat surface diffraction grating substrate is transferred to a flexible material, and the flexible material is fixed to a curved surface substrate, thereby forming a curved surface diffraction grating cast.

Japanese Unexamined Patent Application, Publication No. 2010-25723 discloses an X-ray reflector manufacturing method that includes a smoothing process of smoothing a surface of a silicon substrate so as to make it available for X-ray reflection; and a plastic deformation process of plastically deforming the silicon substrate by applying pressure and heat with a matrix having a predetermined curved surface shape, thereby making the surface of the silicon substrate have the predetermined curved surface shape.

Among the above-described diffraction grating fabrication methods, in the diffraction grating manufacturing method using semiconductor process, which is described in PCT international publication WO08/081555, it is difficult to accurately form a diffraction grating pattern.

With all the technologies described in Japanese Unexamined Patent Application, Publication No. Sho 61-72202, Japanese Unexamined Patent Application, Publication No. Hei 8-29610, and Japanese Unexamined Patent Application, Publication No. Hei 9-5509, because a flexible material is used at the stage of forming a diffraction grating pattern, pattern accuracy is reduced.

Furthermore, although Japanese Unexamined Patent Application, Publication No. 2010-25723 describes a method of plastically deforming a silicon substrate, this invention relates to an X-ray reflector, and, if this method is used for diffraction grating fabrication, a silicon diffraction grating pattern is also smoothed under a high-temperature and hydrogen atmosphere. Then, plastic deformation needs to be conducted to curve a silicon flat surface diffraction grating, dislocation lines occur, and voids etc. occur when the diffraction grating is fixed to a curved fixing substrate, thus reducing surface accuracy.

The present invention has been made to solve these problems, and an object thereof is to fabricate a curved surface diffraction grating having a desired curvature with high accuracy.

SUMMARY OF THE INVENTION

In order to solve the above-described problems, the present invention employs, for example, the configurations described in claims.

The present invention includes a plurality of aspects to solve the above-described problems. According to one aspect, the present invention provides a curved surface diffraction grating fabrication method, including: a step of forming a diffraction grating pattern on a flat-shaped silicon substrate; a step of curving the silicon substrate on which the diffraction grating pattern is formed, by pressing, in a heated state, a fixing substrate having a shape with a desired curved surface onto the silicon substrate and of fixing the silicon substrate on which the diffraction grating pattern is formed to the fixing substrate having the shape with the curved surface, to fabricate a curved surface diffraction grating cast; and a step of bringing a member having flexibility into contact with the curved surface diffraction grating cast, to transfer the diffraction grating pattern to the member.

According to another aspect, the present invention provides a curved surface diffraction grating fabrication method, including: a step of forming a film of silicon oxide or silicon nitride on a flat-shaped silicon substrate; a step of forming a diffraction grating pattern on the silicon oxide or the silicon nitride; a step of curving the silicon substrate on which the diffraction grating pattern is formed, by pressing, in a heated state, a curved surface substrate having a shape with a desired curved surface onto the silicon substrate; a step of fixing the curved silicon substrate to a fixing substrate having a curved surface, to fabricate a curved surface diffraction grating cast; and a step of bringing a member having flexibility into contact with the curved surface diffraction grating cast, to transfer the diffraction grating pattern to the member.

According to still another aspect, the present invention provides a curved surface diffraction grating cast that is used to fabricate a curved surface diffraction grating by bringing a member having flexibility into contact with the curved surface diffraction grating cast, wherein a flat-shaped silicon substrate on which a diffraction grating pattern is formed is curved and is fixed to a fixing substrate having a shape with a desired curved surface.

DETAILED DESCRIPTION OF THE PREFERRED EMBODIMENTS

Embodiments of the present invention will be described below with reference to the drawings.

First, a description will be given of specific shapes of curved surface diffraction gratings.

Spherical Surface Diffraction Grating

Figure 1:
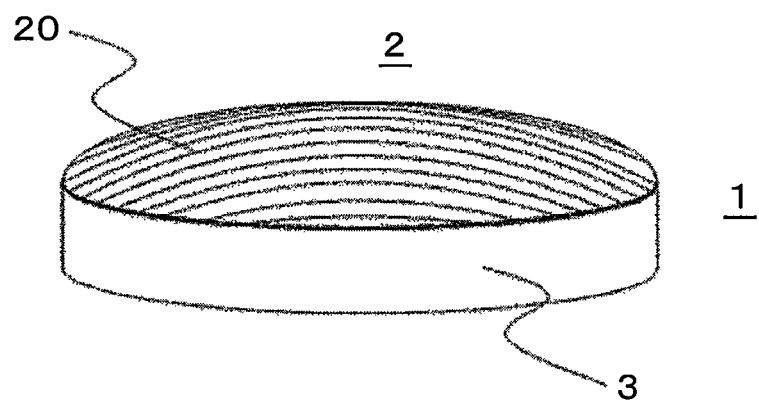
FIG. 1 is a view showing, in outline, a spherical surface diffraction grating cast.

A spherical surface diffraction grating is a diffraction grating having a spherical surface with a uniform curvature in an axial direction. As shown in FIG. 1, a curved surface diffraction grating cast 1 is composed of a silicon substrate 2 on which a diffraction grating pattern 20 is formed and a fixing substrate 3. The silicon substrate 2 and the fixing substrate 3 are bonded to each other through direct bonding, anodic bonding, metal eutectic bonding, or resin bonding. The curved surface diffraction grating cast 1 is transferred to resin or a metal thin film, to fabricate a curved surface diffraction grating.

Toroidal Diffraction Grating

Figure 2:
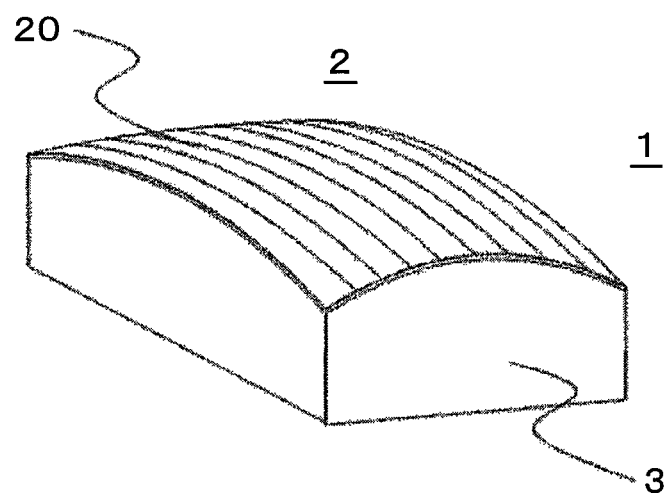
FIG. 2 is a view showing, in outline, a toroidal diffraction grating cast.

A toroidal diffraction grating is a diffraction grating having a toroidal surface with different curvatures in an axial direction, unlike the spherical surface diffraction grating. As shown in FIG. 2, a curved surface diffraction grating cast 1 is composed of a silicon substrate 2 on which a diffraction grating pattern 20 is formed and a fixing substrate 3. The silicon substrate 2 is plastically deformed based on the fixing substrates 3; therefore, the silicon substrate 2 can be mounted on the toroidal surface, which has different curvatures in the axial direction. The silicon substrate 2 and the fixing substrate 3 are bonded to each other through direct bonding, anodic bonding, metal eutectic bonding, or resin bonding. The curved surface diffraction grating cast 1 is transferred to resin or a metal thin film, to fabricate a curved surface diffraction grating.

Next, fabrication methods for the above-described curved surface diffraction gratings will be described. A plurality of fabrication methods to be described below can be used as fabrication methods for curved surface diffraction gratings including the above-described spherical surface diffraction grating and toroidal diffraction grating as typical examples.

Example 1

Figure 3:
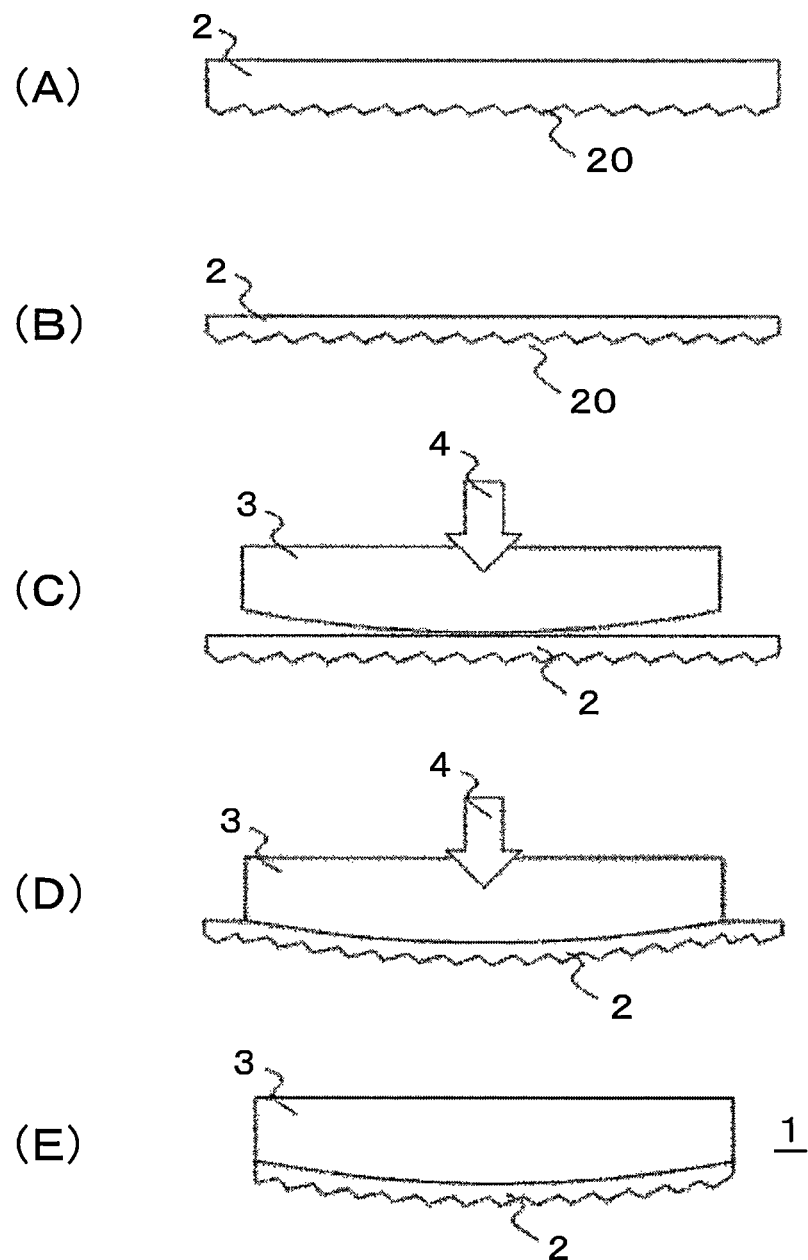
FIGS. 3A to 3E are views showing a curved surface diffraction grating cast fabrication method according to Example 1 of the present invention.

A method of fabricating a curved surface diffraction grating cast 1 according to Example 1 will be described with reference to FIGS. 3A to 3E. A diffraction grating pattern 20 is formed on a flat-shaped bulk silicon substrate 2 by semiconductor processing (photolithography and etching) (FIG. 3A). After the diffraction grating pattern is formed, the silicon substrate 2 is thinned down to 50 μm by polishing (FIG. 3B). Note that this thinning process is not essential, and the diffraction grating pattern 20 may be formed on a silicon substrate 2 that has already been thinned. A fixing substrate 3 that is made from silicon and has a shape with a desired curved surface and a weight 4 that is used for pressing are placed on the back side of the surface of the silicon substrate 2 on which the diffraction grating pattern 20 has been formed (FIG. 3C). In this state, the temperature is raised to a temperature at which silicon becomes viscoelastic, and the fixing substrate 3 is pressed onto the flat-shaped silicon substrate 2, thereby plastically deforming the silicon substrate 2 (FIG. 3D). When hydroxyl is formed on the bonding surfaces of the silicon substrate 2 and the fixing substrate 3 at this time, the silicon substrate 2 can be plastically deformed, and the silicon substrate 2 and the fixing substrate 3 can be bonded to each other at the same time. Finally, unnecessary portions of the silicon substrate 2, such as portions thereof sticking out from the fixing substrate 3, are removed, thereby obtaining the curved surface diffraction grating cast 1 (FIG. 3E).

A feature of this Example is that the diffraction grating pattern 20, which constitutes the cast, is a solid like the silicon substrate 2 and is formed on a bulk that is not distorted during pattern formation. This makes it possible to forma cast having a diffraction grating pattern with little pattern distortion, thus eventually fabricating a curved surface diffraction grating with little pattern distortion. Furthermore, because the plastic deformation of the silicon substrate 2 progresses from a center portion of the fixing substrate 3, which is made from silicon and has the shape with the curved surface, and the bonding therebetween progresses at the same time, the occurrence of voids can be suppressed. Furthermore, the fixing substrate 3, which is made from silicon and has the same linear expansion coefficient as the silicon substrate 2, is used, thereby making it possible to prevent damage when cooled from a high temperature.

Example 2

Figure 4:
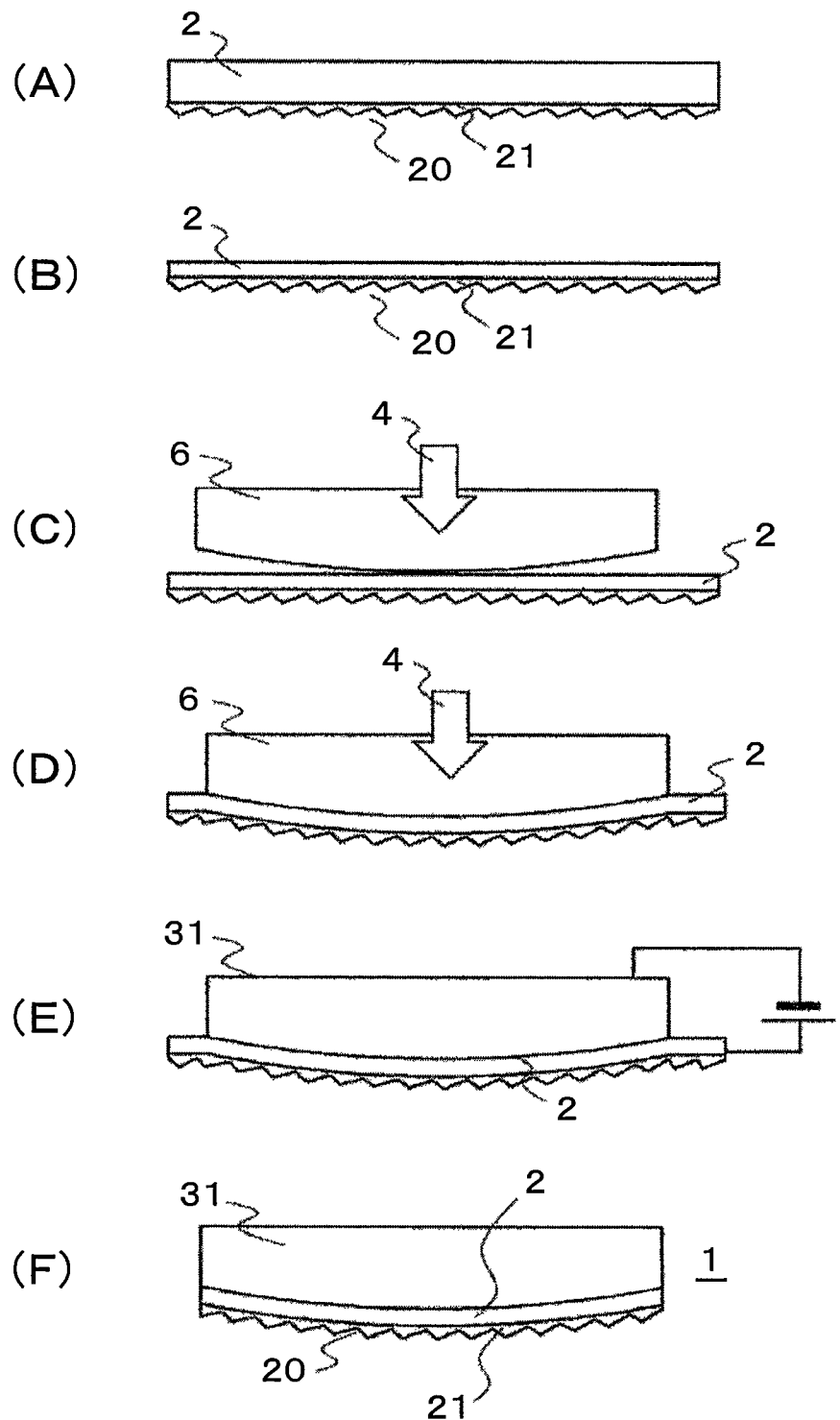
FIGS. 4A to 4F are views showing a curved surface diffraction grating cast fabrication method according to Example 2 of the present invention.

A method of fabricating a curved surface diffraction grating cast 1 according to Example 2 will be described with reference to FIGS. 4A to 4F. A silicon dioxide film 21 is formed on a flat-shaped silicon substrate 2 by a CVD (Chemical Vapor Deposition) method, and a diffraction grating pattern 20 is formed on the silicon dioxide film 21 by semiconductor processing (photolithography and etching) (FIG. 4A). Then, the silicon substrate 2 is thinned down to 50 μm by polishing (FIG. 4B). Note that this thinning process is not essential, and the silicon dioxide film 21 may be formed on a silicon substrate 2 that has already been thinned. Next, a curved surface substrate 6 that is made from quartz and has a shape with a desired curved surface and a weight 4 that is used for pressing are placed on the back side of the surface of the silicon substrate 2 on which the diffraction grating pattern 20 has been formed (FIG. 4C). In this state, the temperature is raised to a temperature at which silicon becomes viscoelastic, and the atmosphere is changed to a hydrogen atmosphere, and the curved surface substrate 6 is pressed onto the flat-shaped silicon substrate 2, thereby plastically deforming the silicon substrate 2 (FIG. 4D). Then, the curved surface substrate 6, which is made from quartz, is removed, and a fixing substrate 31 that is made from heat-resistant glass is placed on the back surface of the silicon substrate 2. Next, anodic bonding is conducted with the silicon substrate 2 serving as a positive electrode and the fixing substrate 31, which is made from heat-resistant glass, serving as a negative electrode (FIG. 4E). Finally, unnecessary portions of the silicon substrate 2, such as portions thereof sticking out from the fixing substrate 3, are removed, thereby obtaining the curved surface diffraction grating cast 1 (FIG. 4F).

According to this Example, because the diffraction grating pattern 20 is formed on the silicon dioxide film 21, the diffraction grating pattern 20 is not planarized even in a hydrogen atmosphere. Furthermore, because hydrogen passes through the silicon dioxide film 21, the surface of the silicon substrate 2 under the silicon dioxide film 21 is planarized, thereby preventing the occurrence of dislocation lines. Then, the cast 1 is used for transferring to a metal thin film or resin, thereby making it possible to fabricate a curved surface diffraction grating with no dislocation lines.

Example 3

Figure 5:
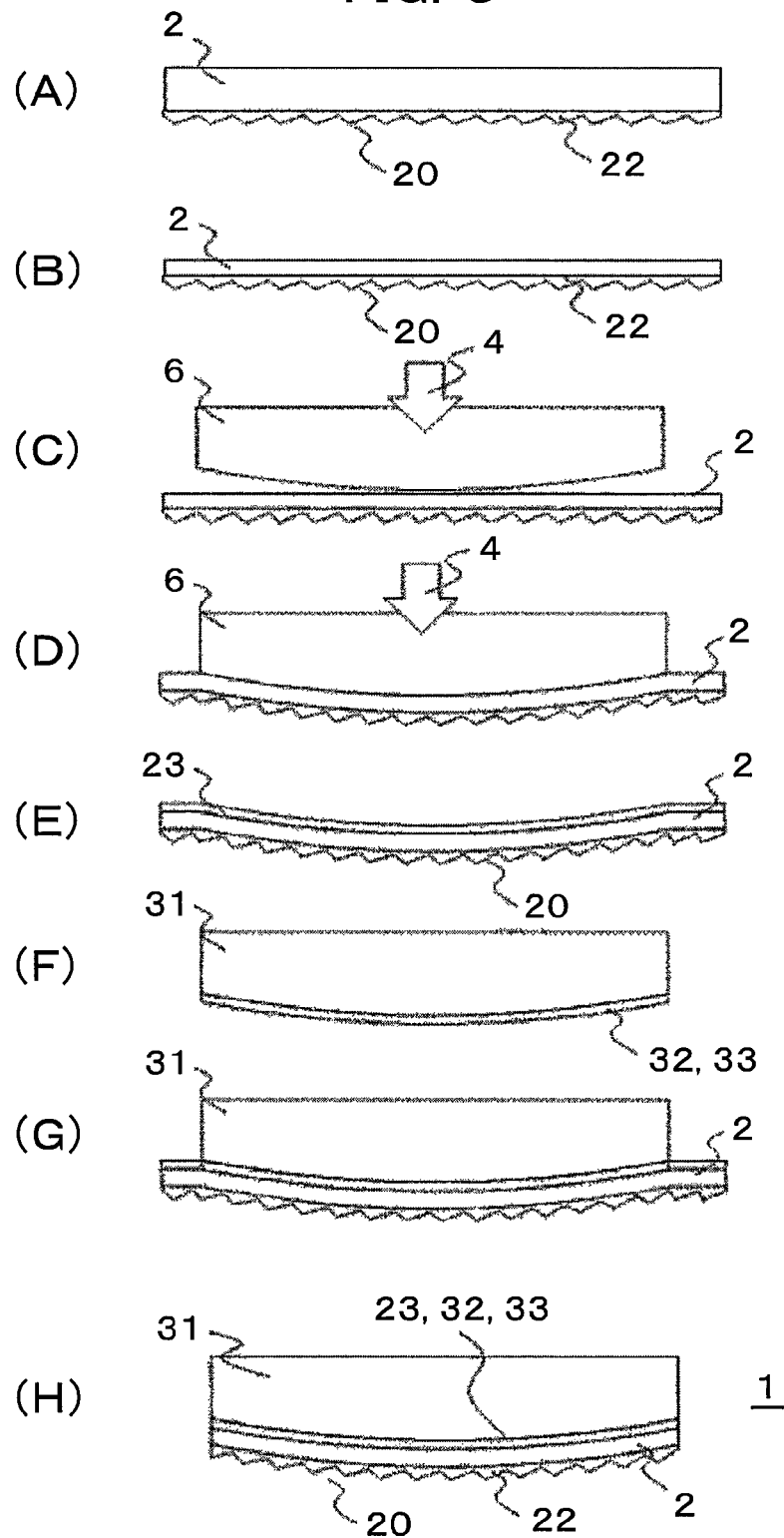
FIGS. 5A to 5H are views showing a curved surface diffraction grating cast fabrication method according to Example 3 of the present invention.

A method of fabricating a curved surface diffraction grating cast 1 according to Example 3 will be described with reference to FIGS. 5A to 5H. A silicon nitride film 22 is formed on a flat-shaped silicon substrate 2 by the CVD (Chemical Vapor Deposition) method, and a diffraction grating pattern 20 is formed on the silicon nitride film 22 by semiconductor processing (photolithography and etching) (FIG. 5A). Then, the silicon substrate 2 is thinned down to 50 μm by polishing (FIG. 5B). Note that this thinning process is not essential, and the silicon nitride film 22 may be formed on a silicon substrate 2 that has already been thinned. Next, a curved surface substrate 6 that is made from quartz and has a shape with a desired curved surface and a weight 4 that is used for pressing are placed on the back side of the surface of the silicon substrate 2 on which the diffraction grating pattern 20 has been formed (FIG. 5C). In this state, the temperature is raised to a temperature at which silicon becomes viscoelastic, and the atmosphere is changed to a hydrogen atmosphere, and the curved surface substrate 6 is pressed onto the flat-shaped silicon substrate 2, thereby plastically deforming the silicon substrate 2 (FIG. 5D). Then, after the curved surface substrate 6, which is made from quartz, is removed, a reactive layer 23 is formed by sputtering Cr, Ni, and Au in this order on the back side of the surface of the silicon substrate 2 on which the diffraction grating pattern 20 has been formed (FIG. 5E). Furthermore, a lower metal layer 32 is formed by sputtering Cr, Ni, and Au in this order on a fixing substrate 31 that is made from heat-resistant glass, and an adhesion layer 33 is formed, for example, by plating Au—Sn on the lower metal layer 32 (FIG. 5F). Next, the silicon substrate 2 and the fixing substrate 31, which is made from heat-resistant glass, are brought into contact with each other, are heated to 300° C., and are subjected to eutectic bonding (FIG. 5G). Finally, unnecessary portions of the silicon substrate 2, such as portions thereof sticking out from the fixing substrate 3, are removed, thereby obtaining the curved surface diffraction grating cast 1 (FIG. 5H).

According to this Example, because the diffraction grating pattern 20 is formed on the silicon nitride film 22, as in Example 2, the diffraction grating pattern 20 is not planarized even in a hydrogen atmosphere. Furthermore, because hydrogen passes through the silicon nitride film 22, the surface of the silicon substrate under the silicon nitride film 22 is planarized, thereby suppressing the occurrence of dislocation lines. Then, this cast is used for transferring to a metal thin film or resin, thereby making it possible to fabricate a curved surface diffraction grating with no dislocation lines.

Example 4

Figure 6:
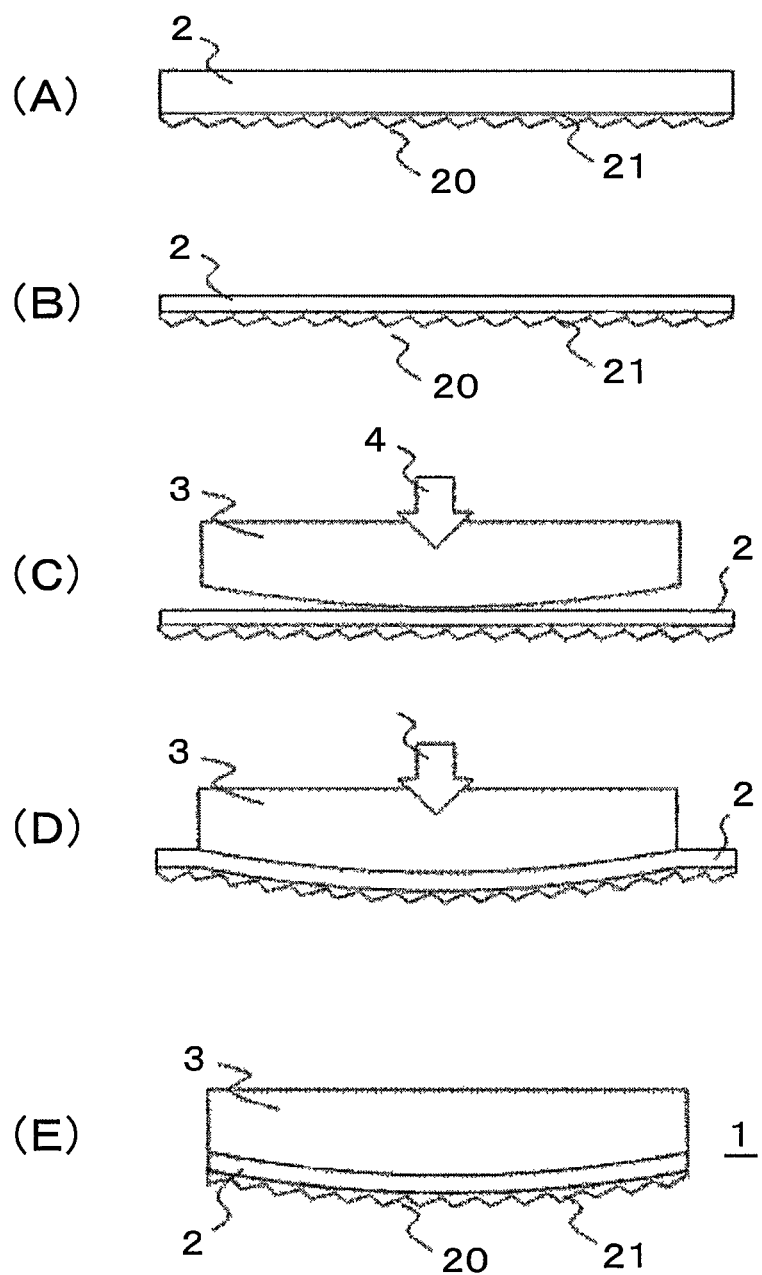
FIGS. 6A to 6E are views showing a curved surface diffraction grating cast fabrication method according to Example 4 of the present invention.

A method of fabricating a curved surface diffraction grating cast 1 according to Example 4 will be described with reference to FIGS. 6A to 6E. A silicon dioxide film 21 is formed on a flat-shaped bulk silicon substrate 2 by the CVD (Chemical Vapor Deposition) method, and a diffraction grating pattern 20 is formed on the silicon dioxide film 21 by semiconductor processing (photolithography and etching) (FIG. 6A). Then, after the diffraction grating pattern is formed, the silicon substrate 2 is thinned down to 50 μm by polishing (FIG. 6B). Note that this thinning process is not essential, and the silicon dioxide film 21 may be formed on a silicon substrate 2 that has already been thinned. A fixing substrate 3 that is made from silicon and has a shape with a desired curved surface and a weight 4 that is used for pressing are placed on the back side of the surface of the silicon substrate 2 on which the diffraction grating pattern 20 has been formed (FIG. 6C). In this state, the temperature is raised to a temperature at which silicon becomes viscoelastic, the atmosphere is changed to a hydrogen atmosphere, and the fixing substrate 3 is pressed onto the flat-shaped silicon substrate 2, thereby plastically deforming the silicon substrate 2 (FIG. 6D). When hydroxyl is formed on the bonding surfaces of the silicon substrate 2 and the fixing substrate 3 at this time, the silicon substrate 2 can be plastically deformed, and the silicon substrate 2 and the fixing substrate 3 can be bonded to each other at the same time. Finally, unnecessary portions of the silicon substrate 2, such as portions thereof sticking out from the fixing substrate 3, are removed, thereby obtaining the curved surface diffraction grating cast 1 (FIG. 6E).

A feature of this Example is that the diffraction grating pattern, which constitutes the cast, is a solid like the silicon substrate 2 and is formed on a bulk that is not distorted during pattern formation. This makes it possible to form a cast having a diffraction grating pattern with little pattern distortion, thus eventually fabricating a curved surface diffraction grating with little pattern distortion. Furthermore, because the plastic deformation of the silicon substrate 2 progresses from a center portion of the fixing substrate 3, which is made from silicon and has the shape with the curved surface, and the bonding therebetween progresses at the same time, the occurrence of voids can be suppressed. The fixing substrate 3, which is made from silicon and has the same linear expansion coefficient as the silicon substrate 2, is used, thereby making it possible to prevent damage when cooled from a high temperature.

Furthermore, because the diffraction grating pattern 20 is formed on the silicon dioxide film 21, as in Examples 2 and 3, the diffraction grating pattern 20 is not planarized even in a hydrogen atmosphere. Furthermore, because hydrogen passes through the silicon dioxide film 21, the surface of the silicon substrate under the silicon dioxide film 21 is planarized, thereby preventing the occurrence of dislocation lines. Then, this cast is used for transferring to a metal thin film or resin, thereby making it possible to fabricate a curved surface diffraction grating with no dislocation lines.

The curved surface diffraction grating fabrication methods described in the above Examples have the following features.

In the process of plastically deforming a silicon substrate at a high temperature through application of a load, a curved surface substrate having a shape with a desired curved surface is used as the load to plastically deform the silicon substrate, thereby curving the silicon substrate so as to have a shape with the desired curved surface. The curved silicon substrate is fixed to a fixing substrate having a curved surface, thereby making it possible to fabricate a curved surface diffraction grating cast. This curved surface diffraction grating cast is transferred to a metal film or resin to fabricate a curved surface diffraction grating. Note that, when a thick silicon substrate is used, the process of fixing it to the fixing substrate can be omitted.

In the process of plastically deforming a silicon substrate at a high temperature through application of a load, when a curved surface substrate having a shape with a predetermined curved surface is used as the load to plastically deform the silicon substrate, dislocation lines occur along a crystal orientation (110). Dislocation lines occur fourfold-symmetrically when a (100) crystal orientation is used for the silicon substrate and sixfold-symmetrically when a (111) crystal orientation is used for the silicon substrate.

The above-described dislocation lines influence a diffraction grating pattern to increase scattering light. Therefore, the (110) crystal orientation is used for the silicon substrate to make dislocation lines occur in parallel to the diffraction grating pattern, thereby making it possible to reduce the scattering light. Furthermore, when polycrystalline silicon is used for the silicon substrate, is thinned, and is plastically deformed, dislocation lines occur randomly, thus making it possible to fabricate a curved surface diffraction grating cast that has an extremely-low influence with respect to scattering.

In order to prevent the occurrence of dislocation lines from exerting an influence on the diffraction grating pattern, an amorphous film, such as a silicon oxide film or a silicon nitride film, is formed on a monocrystalline silicon substrate, the diffraction grating pattern is formed on the silicon oxide film or the silicon nitride film, and then the silicon substrate is plastically deformed under a hydrogen atmosphere, thereby making it possible to fabricate a curved surface diffraction grating cast in which the influence of dislocation lines is mitigated because the diffraction grating pattern on the silicon oxide film or the silicon nitride film is not smoothed, and only the silicon surface below the silicone oxide film or the silicon nitride film is smoothed. Furthermore, after the silicon substrate is plastically deformed, the silicon substrate may be heat-treated under a hydrogen atmosphere, to reduce the number of dislocation lines.

In the process of fixing the silicon substrate to the fixing substrate, when contact interfaces of the silicon substrate and the fixing substrate, which has a curved surface, are activated, it is possible to directly bond the silicon substrate and the fixing substrate, to simultaneously conduct plastic deformation of the silicon substrate and fixing thereof, and to fabricate a curved surface diffraction grating cast in the same process. Because plastic deformation and direct bonding are simultaneously conducted under a high-temperature atmosphere, if there is a large difference in linear expansion coefficient between the silicon substrate and the fixing substrate, damage is caused due to differential shrinkage during a cooling process; therefore, materials having almost the same linear expansion coefficients are selected for the silicon substrate and the fixing substrate. If a flat surface diffraction grating is formed on the silicon substrate, it is preferred that the same silicon be used as a material for the fixing substrate, which has a curved surface. Furthermore, when plastic deformation and direct bonding are simultaneously conducted, because the silicon substrate is plastically deformed from the center thereof, bonding progresses from the center toward an outer circumference. Thus, voids are not formed between the silicon substrate and the fixing substrate; therefore, it is possible to fabricate a curved surface diffraction grating cast with surface accuracy.

In the process of fixing the silicon substrate to the fixing substrate, the silicon substrate that has been plastically deformed and the fixing substrate are anodically bonded, thereby making it possible to fabricate a curved surface diffraction grating cast in which an adhesion layer is formed between the substrates. Because the above-described direct bonding and anodic bonding are not influenced by the adhesion layer, it is possible to fabricate a curved surface diffraction grating cast with high surface accuracy.

Although the surface accuracy is reduced compared with direct bonding and anodic bonding, a bonding material, such as solder or an adhesive, may be introduced for the contact interfaces of the silicon substrate and the fixing substrate.

As will be described next in Example 5, a curved surface diffraction grating cast fabricated in any of the above-described methods is transferred to resin or a metal thin film to fabricate a curved surface diffraction grating.

Example 5

Figure 7:
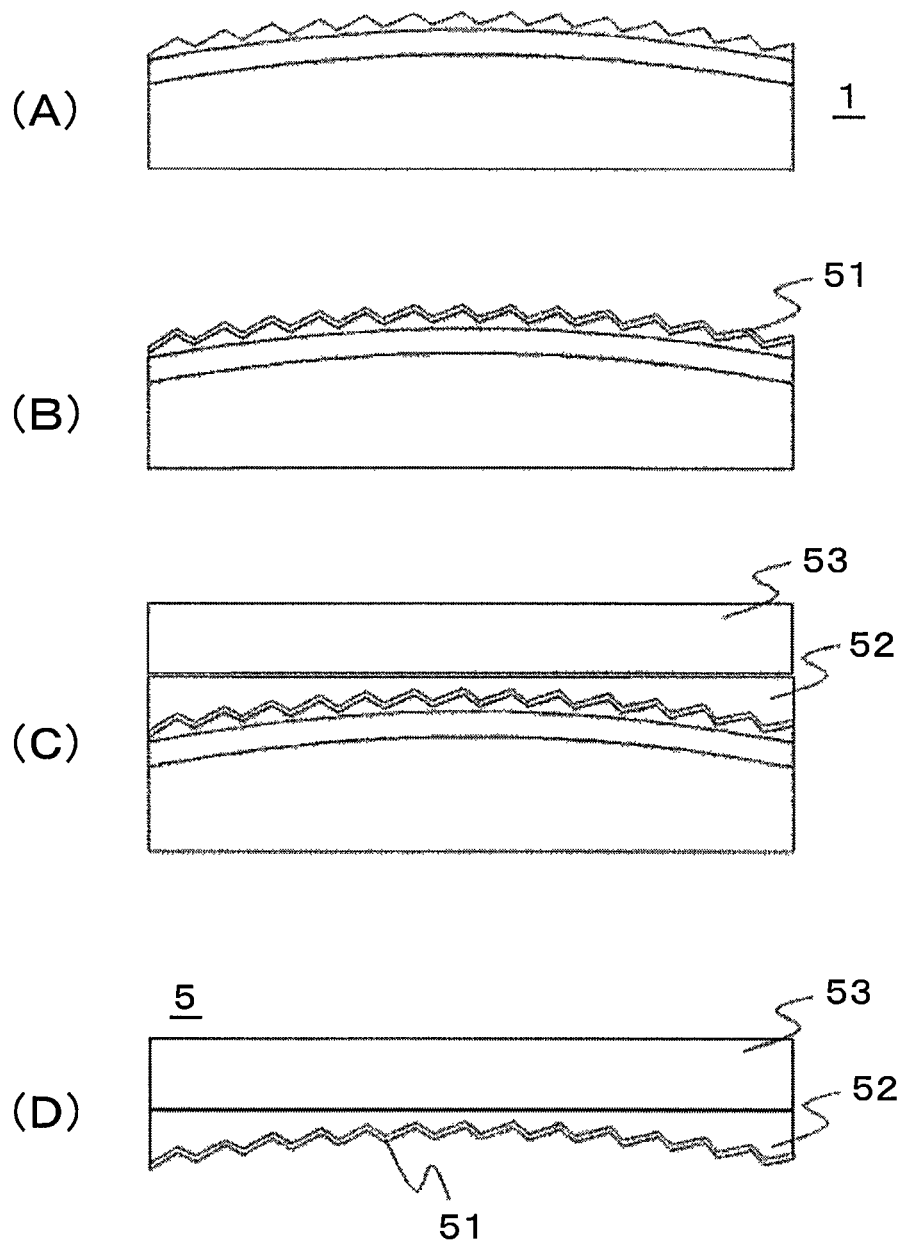
FIGS. 7A to 7D are views showing a method of fabricating a curved surface diffraction grating by using a curved surface diffraction grating cast of the present invention.

A method of fabricating a curved surface diffraction grating by using a curved surface diffraction grating cast 1 that is described in one of Examples 1 to 4 and transferring a pattern to a member having flexibility will be described with reference to FIGS. 7A to 7D. On the surface of the curved surface diffraction grating cast 1 (FIG. 7A), a release layer (not shown) and a reflective film 51 are formed (FIG. 7B). Liquid-state resin 52 to be cured and a substrate 53 are placed on the reflective film 51 (FIG. 7C). After the resin is cured, the resin 52 and the substrate 53 are detached from the curved surface diffraction grating cast 1 to obtain a curved surface diffraction grating 5 (FIG. 7D). Note that a metal film having flexibility may be used instead of resin. Furthermore, after the diffraction grating pattern 20 is transferred to the resin 52 by using the curved surface diffraction grating cast 1, the reflective film 51 may be formed on the surface thereof.

Example 6

Figure 8:
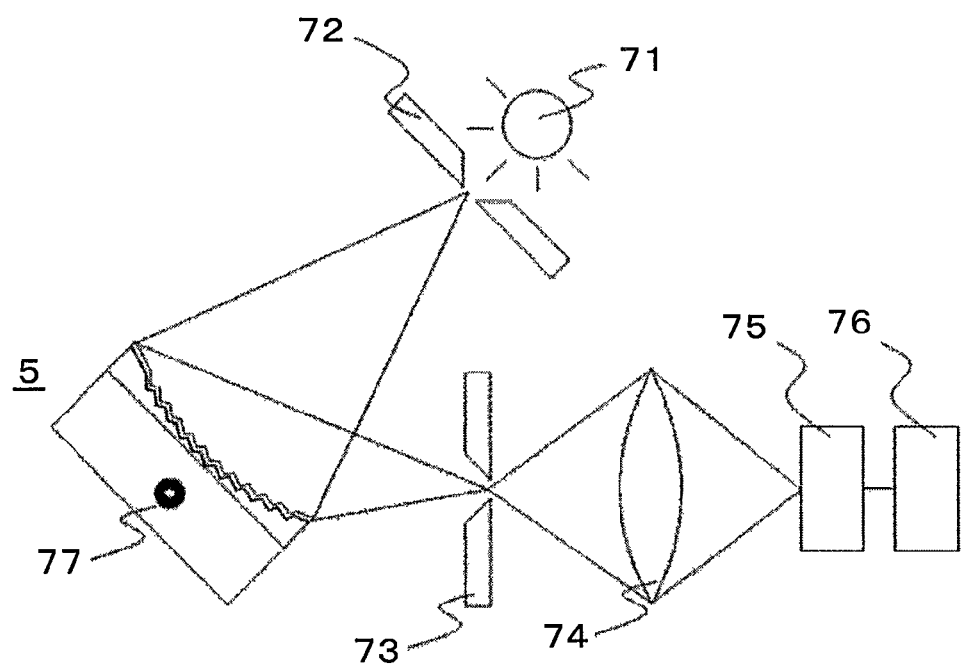
FIG. 8 is a view showing an example spectrophotometer using a curved surface diffraction grating.

An example spectrophotometer using the curved surface diffraction grating 5, which is described in Example 5, will be described with reference to FIG. 8. Light from a light source 71 is limited by an entrance slit 72 and enters the curved surface diffraction grating 5, which can be rotated about a shaft 77. The light entering the curved surface diffraction grating 5 is diffracted at angles different for wavelengths, and light having a specific wavelength passes through an exit slit 73, is focused by a collective lens 74, and is radiated onto a specimen 75. Light is absorbed by the specimen 75, and a change in light intensity is detected by a detector 76. By rotating the curved surface diffraction grating 5 about the shaft 77, the wavelength of light passing through the exit slit 73 is changed, and the spectrum absorbed by the specimen 75 can be detected. Therefore, the structural absorption property and the concentration of the specimen 75 can be measured.

What is claimed is:

1. A curved surface diffraction grating fabrication method, comprising:
- a step of forming a film of silicon oxide or silicon nitride on a flat-shaped silicon substrate;
- a step of forming a diffraction grating pattern on the silicon oxide or the silicon nitride;
- a step of spherically or toroidally curving the silicon substrate on which the diffraction grating pattern is formed, by pressing, in a heated state, a curved surface substrate having a shape with a spherical or toroidal surface onto the silicon substrate;
- a step of fixing the spherically or toroidally curved silicon substrate to a fixing substrate having a curved surface, to fabricate a spherically or toroidally curved surface diffraction grating cast; and
- a step of bringing a member having flexibility into contact with the spherically or toroidally curved surface diffraction grating cast, to transfer the diffraction grating pattern to the member.

2. The curved surface diffraction grating fabrication method according to claim 1, wherein the pressing of the curved surface substrate having the shape with the spherical or toroidal surface onto the silicon substrate on which the diffraction grating pattern is formed, in the heated state, is conducted under a hydrogen atmosphere.

3. The curved surface diffraction grating fabrication method according to claim 1, wherein the spherical or toroidal silicon substrate on which the diffraction grating pattern is formed and the fixing substrate are anodically bonded.

4. The curved surface diffraction grating fabrication method according to claim 1, wherein the spherical or toroidal silicon substrate on which the diffraction grating pattern is formed and the fixing substrate are bonded by an adhesive layer.

5. The curved surface diffraction grating fabrication method according to claim 1, wherein the fixing substrate is made from heat-resistant glass.

* * * * *